(12) United States Patent
San Martin

(10) Patent No.: US 10,254,431 B2
(45) Date of Patent: Apr. 9, 2019

(54) LATEROLOG ARRAY TOOL FOR PERFORMING GALVANIC MEASUREMENT

(71) Applicant: Halliburton Energy Services, Inc., Houston, TX (US)

(72) Inventor: Luis Emilio San Martin, Houston, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 0 days.

(21) Appl. No.: 15/312,181

(22) PCT Filed: Dec. 30, 2014

(86) PCT No.: PCT/US2014/072682
§ 371 (c)(1),
(2) Date: Nov. 17, 2016

(87) PCT Pub. No.: WO2016/108831
PCT Pub. Date: Jul. 7, 2016

(65) Prior Publication Data
US 2017/0090059 A1 Mar. 30, 2017

(51) Int. Cl.
*G01V 3/20* (2006.01)
*G01V 3/24* (2006.01)
*G01V 3/28* (2006.01)

(52) U.S. Cl.
CPC ............ *G01V 3/20* (2013.01); *G01V 3/24* (2013.01); *G01V 3/28* (2013.01)

(58) Field of Classification Search
CPC .................... G01V 3/20; G01V 3/28
(Continued)

(56) References Cited

U.S. PATENT DOCUMENTS

| 4,468,623 A * | 8/1984 | Gianzero ............... G01V 3/20 324/355 |
| 6,348,796 B2 * | 2/2002 | Evans ................... G01V 3/20 324/367 |

(Continued)

FOREIGN PATENT DOCUMENTS

| EP | 0544583 B1 | 12/1995 |
| WO | 2011090656 A2 | 7/2011 |
| WO | 2013096576 A1 | 6/2013 |

OTHER PUBLICATIONS

PCT, "International Search Report", International Search Report on corresponding PCT application (PCT/US2014/072682) from the International Searching Authority (Korean Intellectual Property Office) dated Sep. 1, 2015, 3 pages.
(Continued)

*Primary Examiner* — Jay Patidar
(74) *Attorney, Agent, or Firm* — Gilliam IP PLLC

(57) ABSTRACT

In some embodiments, an apparatus, system, and method may operate to transmit a current from an electrode at a first azimuthal location into a borehole wall in a geological formation, and to receive the first current at a second electrode at a second azimuthal location in the borehole wall. The first and second azimuthal locations are disposed approximately along the same longitudinal location of the borehole wall. The current may be adjusted to maintain a selected voltage profile between the electrodes at the first and second azimuthal locations, and the electrodes at the first and second azimuthal locations may be members of two different sets of azimuthally] differentiated electrodes. Additional apparatus, systems, and methods are disclosed.

13 Claims, 11 Drawing Sheets

(58) Field of Classification Search
USPC .......................................................... 324/366
See application file for complete search history.

(56) References Cited

U.S. PATENT DOCUMENTS

| | | | | |
|---|---|---|---|---|
| 7,066,282 B2* | 6/2006 | Chen | ........................ | G01V 3/24 |
| | | | | 166/250.11 |
| 7,579,841 B2* | 8/2009 | San Martin | .............. | G01V 3/24 |
| | | | | 324/366 |
| 8,284,073 B2 | 10/2012 | Mehta et al. | | |
| 2007/0257678 A1* | 11/2007 | Wang | ........................ | G01V 3/20 |
| | | | | 324/366 |
| 2008/0303526 A1* | 12/2008 | Itskovich | ................. | G01V 3/24 |
| | | | | 324/367 |
| 2011/0025336 A1* | 2/2011 | Forgang | ................... | G01V 3/20 |
| | | | | 324/367 |
| 2013/0024119 A1 | 1/2013 | Tabarovsky et al. | | |

OTHER PUBLICATIONS

PCT, "Written Opinion of the International Searching Authority", Written Opinion on corresponding PCT application (PCT/US2014/072682) from International Searching Authority (Korean Intellectual Property Office) dated Sep. 1, 2015, 13 pages.

* cited by examiner

LATEROLOG ARRAY TOOL FOR PERFORMING GALVANIC MEASUREMENT

BACKGROUND

Understanding the structure and properties of geological formations may reduce the cost of drilling wells for oil and gas exploration. Measurements are typically performed in a borehole (i.e., downhole measurements) in order to attain this understanding. For example, such measurements may identify the composition and distribution of material that surrounds the measurement device downhole. To obtain such measurements, a variety of sensors and mounting configurations may be used.

For example, some downhole tools use electromagnetic receivers as sensors to measure formation resistivity. These include multi-component array induction tools, which use a transmitter to excite orthogonal magnetic dipoles, and electromagnetic receivers to measure the resulting field at various distances from the transmitter. This tool, which can be used to measure anisotropric resistivity ($R_h$, $R_v$) to identify formation types, and features within these formations, has been fairly successful in oil-based mud (OBM) applications. In water-based mud (WBM) applications however, success has been limited due to borehole effects that render less than reliable results whenever the borehole mud is highly conductive.

DETAILED DESCRIPTION

Figure 1:
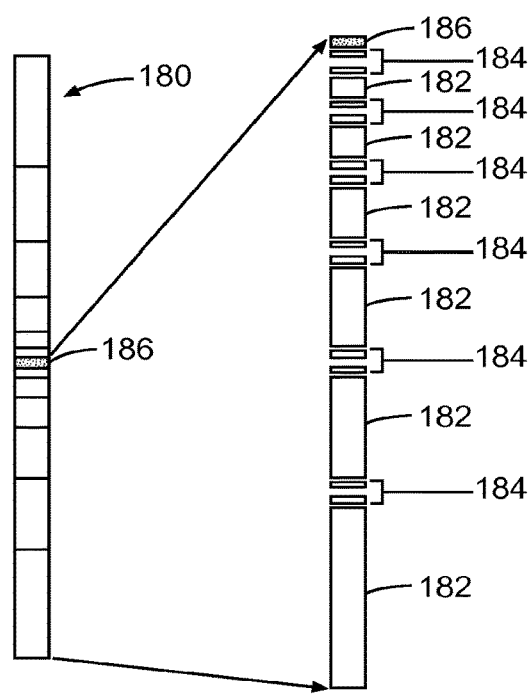
FIG. 1 is a side view of a prior art laterolog electrode array tool.

The value of resistivity in a formation is often useful to assess the presence of hydrocarbons. Thus, over the years, many tools have been designed to measure formation resistivity. These tools can be broadly classified into two groups: galvanic tools and induction tools. In galvanic tools, currents are injected from electrodes into the formation with the current return located at the tool, in the tool string, or at the surface. Usually, these tools operate at a relatively low frequency that varies from a few hertz to a few kilohertz. In the induction tools, there is no current flowing from the tool into the formation. Instead, a time dependent magnetic field is generated by an antenna, to induce currents in the formation. The receiving antennas in the tool measure the magnetic field strength generated by the currents induced in the formation.

Design improvements and increased sophistication have led to the development of so-called "array" tools. Among these are the galvanic array laterolog tools, and the array induction tools, including multi-component array induction tools.

Galvanic array laterolog tools and array induction tools are in a certain sense complementary. In the laterolog tool, the measured signal is proportional to formation resistivity, while in the induction tool, the measured signal is proportional to conductivity. This means the laterolog tool may be more useful in situations where the mud in the borehole has high conductivity, and the induction tool may be more useful when the mud has high resistivity.

The latest advancement in induction tool design, the multi-component array induction tool, is an array induction tool in which the transmitter excites three magnetic dipoles oriented along perpendicular directions and the receivers measure the magnetic field along three orthogonal directions at a variety of distances from the transmitter. This tool can thus be used to evaluate resistivity anisotropy ($R_h$, $R_v$), which allows the identification of a specific type of reservoir often missed by other tools that only measure $R_h$. This tool also measures structural information (e.g., dip and strike angles in layered formations) at different depths of investigation. In many instances, this tool is thus quite useful. However, when the borehole is filled with highly conductive WBM, borehole effects render less than reliable results.

Technology developed to deliver accurate anisotropic resistivity measurements (e.g., $R_h$, $R_v$) and structural information (e.g., dip and strike angles) in highly conductive mud conditions would therefore provide a significant advantage over conventional equipment. A description of such technology follows, in the form of a galvanic tool with increased sensitivity to anisotropy ($R_h$, $R_v$) in dipping and non-dipping formations. This tool can also be used to acquire structural information, to include dip and strike angles, with high resolution. As a galvanic tool, it is well-suited for use in highly conductive mud.

To provide these features, the embodiments disclosed herein differ from traditional array laterolog devices in several respects. For example, to reduce borehole effects, pad-mounted electrodes will be used to inject currents into the formation. A simplified version of the tool might include a center set of pads, with no pads at other levels. However, it may be convenient to use additional sets of pads, perhaps mounted to arms attached above and below the center, to stabilize the tool in the borehole.

The use of pad-mounted electrodes also provides good azimuthal angle resolution, which is not offered on currently-available laterolog tools. Improved azimuthal resolution extends to current returns as well, so that new information (not currently available) is also obtained. This new information helps assess formation structural characteristics, such as the presence of fractures, which have high value in oil and gas exploration operations. To gain further insight into the improvements offered by various embodiments, it may be useful to first consider the operation of prior art tools.

FIG. 1 is a side view of a prior art laterolog electrode array tool 180. In the standard array, a number of current electrodes 182 and voltage electrodes 184 are placed on the tool 180. In this case, the tool 180 has two sets of six electrodes 182, 184 symmetrically placed on both sides of the center electrode 186. In the figure, the half of the tool 180 is shown in disassembled form, to show the placement of the voltage monitoring electrodes 184. By monitoring the voltages and controlling currents emitted by the current electrodes 182, different modes of operation are achieved. The current electrodes 182 inject current into the formation and the voltage electrodes 184 are used to monitor the voltage at different longitudinal points along the tool.

In order to measure resistivity at different depths of investigation (DOIs), several modes of operation are implemented. Conventional tools 180 may thus have different modes of operation that render a DOI ranging from 0.3 m to 2 m, depending on the electrode and tool dimensions, the longitudinal position of return electrodes, and the operating modes that are provided.

Figure 2:
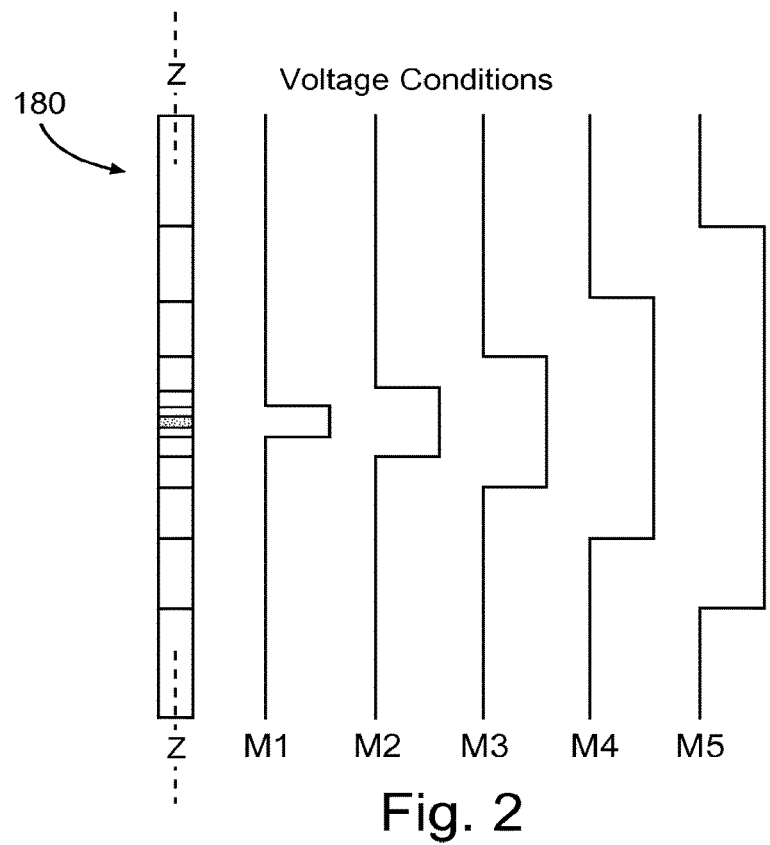
FIG. 2 is a conceptual diagram of operating modes for the array tool shown in FIG. 1.

FIG. 2 is a conceptual diagram of operating modes M1-M5 for the array tool 180 shown in FIG. 1. The modes M1-M5 of operation for the tool 180 may involve a range of voltage conditions to reach a range of investigation depths. In the figure, five modes M1-M5 of operation with different voltage conditions are shown. Here, each mode operates to maintain a voltage across longitudinally-spaced electrodes. However, this limits the usefulness of the tool 180, in that there is a lack of azimuthal (surrounding the longitudinal axis Z of the tool) resolution. Attempts to improve the situation by segmenting the center electrode have not been successful, mostly because conductive mud between the formation and the tool blurs the formation features in the azimuthal direction. Many of the embodiments described herein overcome this deficiency.

Figure 3:
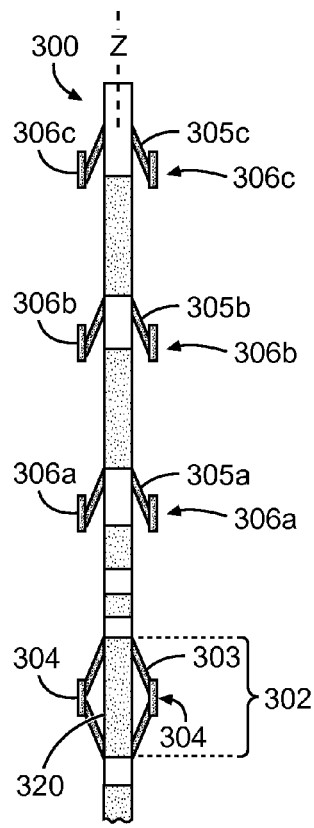
FIG. 3 is a side view of a first laterolog array tool, according to various embodiments of the invention.

For example, FIG. 3 is a side view of a first laterolog array tool 300, according to various embodiments of the invention. Here a new laterolog tool design is shown. Because the configuration is symmetric, only one side is shown, so that details of the construction can be more readily seen. In this case, the central set of pads 304 is installed over a central insulator 320.

The insulator 320 may take the form of a cylinder, as shown, but other shapes are possible, such as a square (as viewed along the Z axis) or some other multi-sided figure, such as a triangle or hexagon, to accommodate various pad configurations, with most pads 304, 306 being attached to one or more arms 303, 305. In many embodiments, at least the outer ends of the insulator 320 are circular, and the entire central portion 302 of the tool is symmetric with respect to the remainder of the tool 300. In this schematic description, the voltage monitoring electrodes are not shown.

The arms 303, 304 enable the pads 304, 306 to touch the wall of the borehole. As a result, the tool 300 has much better azimuthal angle resolution than what can be obtained using the segmented electrodes of conventional laterolog tools.

Figure 4:
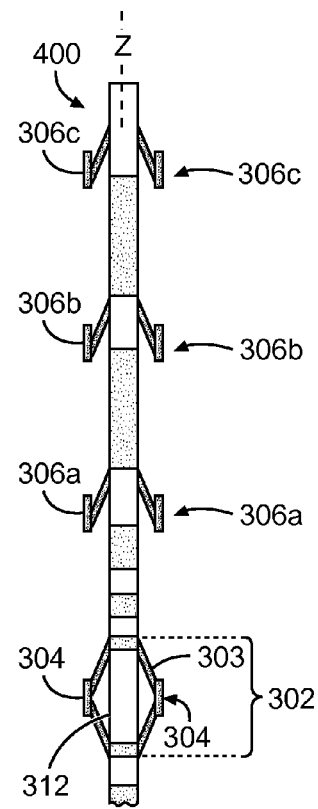
FIG. 4 is a side view of a second laterolog array tool, according to various embodiments of the invention.

FIG. 4 is a side view of a second laterolog array tool 400, according to various embodiments of the invention. Again, in the case of this tool design, the configuration is symmetric, so that only one side is shown. For this embodiment, the central set of pads 304 is installed over a central conductor 312 that can emit current.

Figure 5:
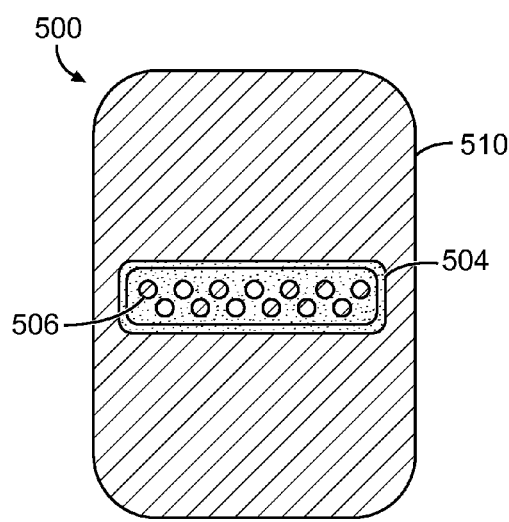
FIG. 5 is a front view of current injection electrodes disposed on a pad and surrounded by insulation, according to various embodiments of the invention.

FIG. 5 is a front view of current injection electrodes 506 disposed on a pad 500 and surrounded by insulation 504, according to various embodiments of the invention. As is the case with various options for tool configurations shown in FIGS. 3 and 4, there are also a variety of configurations available for pads. In this figure, a pad 500 with button electrodes 506 insulated from the surrounding metal base 510 used to focus the currents emanating from the electrodes 506 into a formation, when the pad 500 contacts a formation via the borehole wall. In some embodiments, the electrodes 506 are used to measure return currents, and operate to provide formation property image information. This information can be used to form an image, where each one of the electrodes 506 can operate to provide data that is used to construct a single pixel in the image. Here, a common current source (not shown) drives each of the electrodes. Currents can be focused by keeping voltages equal on the metal base 510 and the electrodes 506.

Figure 6:
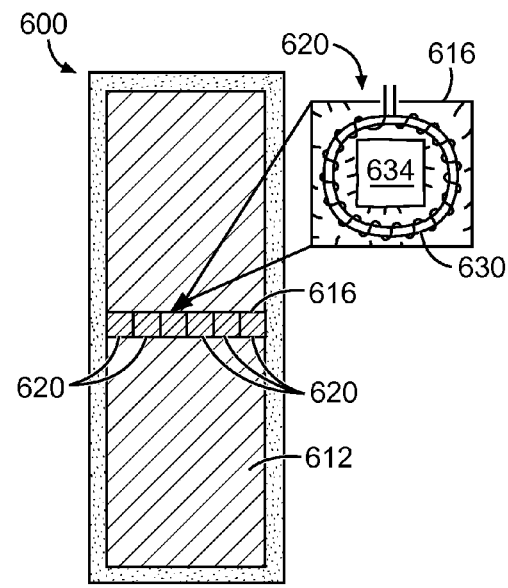
FIG. 6 is a front view of current injection electrodes disposed on a pad comprising a segmented single conductor, according to various embodiments of the invention.

FIG. 6 is a front view of current injection electrodes 620 disposed on a pad 600 comprising a segmented single conductor 612, according to various embodiments of the invention. In this case, the pad 600 is made of a single piece of metal with grooves 616 on its surface. The pad 600 forms a common conductive surface which is driven by a single source. Thus, the pad 600 can be fabricated as a single piece of metal with grooves 616 forming closed loops encircling surfaces carved in the surface of the conductor 612. The pad 600 and the grooves 616 are all conductive.

Toroids 630 are placed (see enlarged portion of the figure) in the grooves 616, so that one toroid 630 surrounds the face 634 of one electrode 620. The toroids 630 can be fabricated from a high magnetic permeability core around which a fine metal wire is wound. The purpose of the toroid 630 is to measure the alternating current that flows across the surface 634. From Maxwell's equations, the alternating current that crosses the surface 634 generates a time dependent magnetic field along the closed path that encircles the surface 634, and this field induces a voltage in the toroid 630.

With this construction, the current out of each electrode 620 is focused without the need for a control because the single conductor 612 naturally focuses the currents into the formation, providing image pixel information for each of the electrodes 620. Each toroid 630 can therefore be used to measure a voltage proportional to the current that flows out of the electrode's face 634 that the toroid 630 encircles. By measuring the current that flows out of the face, image pixel information, and thus an image of the formation contacted by the pad 600, can be generated. This type of measurement is well known to those of ordinary skill in the art.

Figure 7:
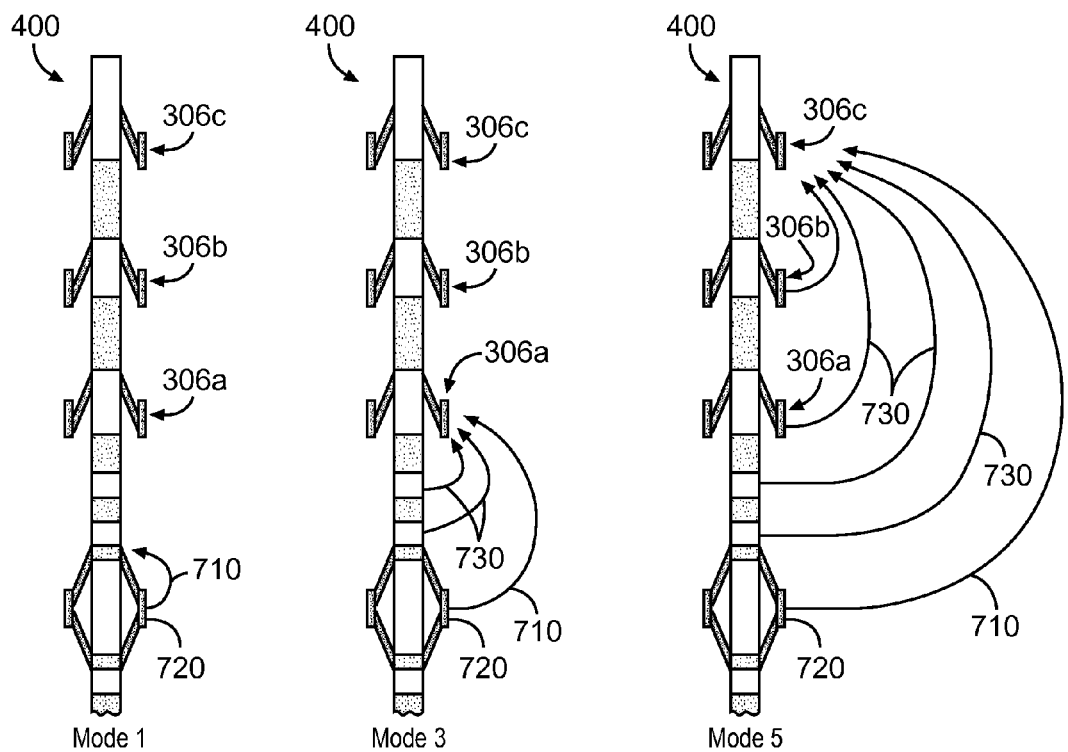
FIG. 7 is a side view of hardware focusing operations conducted using an array tool formed according to various embodiments of the invention.

FIG. 7 is a side view of hardware focusing operations conducted using an array tool 400 formed according to various embodiments of the invention. Here current flow patterns for some representative hardware focusing modes (HFMs) are shown. In this case, each HFM is determined by a different voltage condition. The purpose of the different voltage conditions is to focus the current 710 of the center electrode 720 deeper and deeper into the formation. The result of the measurement is given by the voltage of the center electrode 720 (measured at the monitoring electrodes, such as electrodes 306*a*, 306*b*, 306*c*) divided by the current at the electrode that measures the voltage. The varying DOI of each mode (e.g., Mode 1, Mode 3, and Mode 5) provides a radial resistivity profile of the formation. As part of using HFMs, the voltage conditions are maintained via active control. Thus, the monitoring voltages are measured at the monitoring electrodes 306*a*, 306*b*, and 306*c*, and the currents in the current source electrodes (e.g., center electrode 720) are adjusted to enforce the voltage conditions. In this way, the current 710, 730 is adjusted to maintain a desired voltage, perhaps using a hardware or software feedback loop, to provide a desired voltage profile at one or more of the monitoring electrodes 306*a*, 306*b*, and 306*c*.

Figure 8:
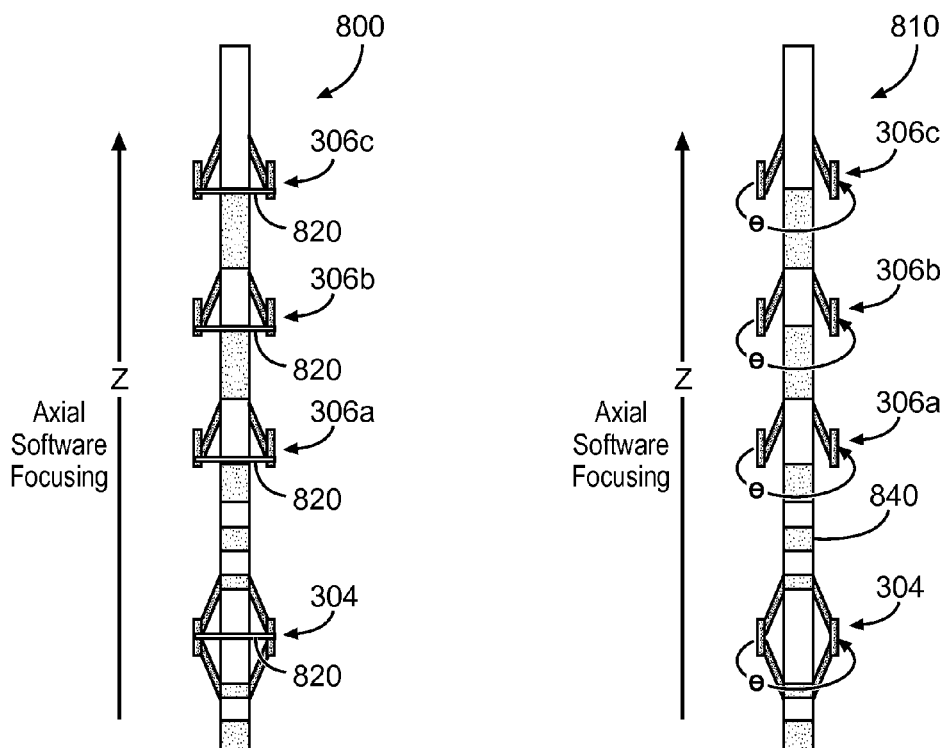
FIG. 8 is a side view of software focusing operations conducted using an array tool formed according to various embodiments of the invention.

FIG. 8 is a side view of software focusing operations conducted using array tools 800, 810 formed according to various embodiments of the invention. Here it can be seen that in addition to the software focusing in the axial direction Z, software focusing about the azimuth direction (angle) θ is also provided.

For the tool 800, software focusing can be executed along the axial direction Z using software focusing modes (SFMs) that include the same or different frequencies in the electrode carried by the electrodes in pads 304, 306. In the tool 800, electric connections (symbolically shown as connections 820) between pads that carry the electrodes 304, 306 can be made using switches or multiplexers, such that the electrodes in the pads 304, 306 have the same potential at each elevation along the Z axis of the tool 800. In the tool 820 (which may be similar to or identical to the toll 810), the electrical connections 820 between the electrodes carried by the pads 304, 306 have been removed. When the electrodes in the pads 304, 306 are operated independently in this manner, the electrodes in different pads at the same elevation can be used to generate currents having the same or different frequencies in the azimuthal direction θ. In this way, a single tool 810 can be used to provide software focusing in two dimensions: along the axial direction Z for a tool axis of the tool and around the azimuthal direction θ. This arrangement lends itself to many possible modes of operation.

Figure 9:
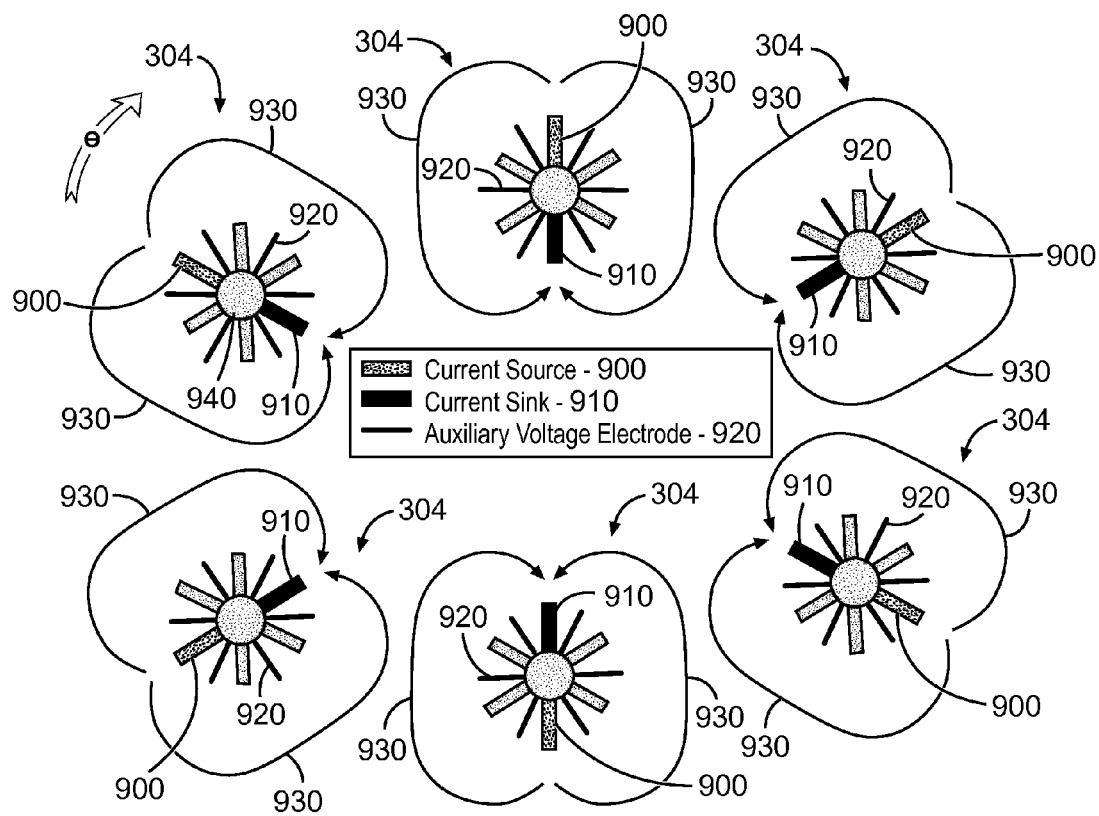
FIG. 9 is a top view of current injection sequencing operations according to various embodiments of the invention.

For example, FIG. 9 is a top view of current injection sequencing operations according to various embodiments of the invention. In this operating mode, the pads 304 that carry the electrodes are at the same elevation. Here, the pads 304 are shown symbolically (the pads themselves are not visible—only the electrodes carried by the pads 304 operating at the same elevation are shown), carrying a current source electrode 900, a current sink electrode 910, and auxiliary voltage electrodes 920. Here the current source electrode 900 and the current sink electrode 910 are at the same elevation, at the center of the tool 810 (refer to FIG. 8). The auxiliary electrodes 920 can be used to measure the potential difference at desired locations. Such measurements can give additional information to estimate the anisotropy of the formation.

Thus, for a tool that has this configuration of electrodes 900, 910, modes of operation in which current injection and current return occur at the same elevation (in the axial direction Z) are possible. As shown, the current source electrode 900, as well as the current sink electrode 910, are operated in a clockwise sequence about the azimuth direction θ. The potential on the tool cylinder 940 can be maintained at a voltage of (Vsource−Vsink)/2 or Vsource to focus deeper into the formation. Intermediate pads between source and sink can inject currents to achieve a certain voltage variation along the azimuth angle to focus currents deeper into the formation as well (this example is not shown in FIG. 9).

The currents injected by each pad can have different frequencies. Indeed, individual electrodes may also operate at different frequencies. Additional information can be obtained by measuring the potential difference on the surface of the borehole.

For example, in some embodiments, when operating modes using the source and sink at the same level are employed, voltage measurement points are located between electrodes 900, 910. The potential difference can then be measured between two points in a pad carrying multiple auxiliary electrodes 920, or between a pad that carries an auxiliary electrode 920, and a reference electrode (which can be any of the current sink electrodes 910, or other auxiliary electrodes 930, or some other electrode defined for that purpose and not shown in the figure). Electrodes carried by pads at other elevations (e.g., pads 306 shown in FIG. 8), or on the tool cylinder 940 (e.g., center electrodes 840 shown in FIG. 8), can also be used to measure potential differences. These measurements can give additional information in anisotropic formations. The details of voltage measurement using a single electrode will now be described.

Figure 10:
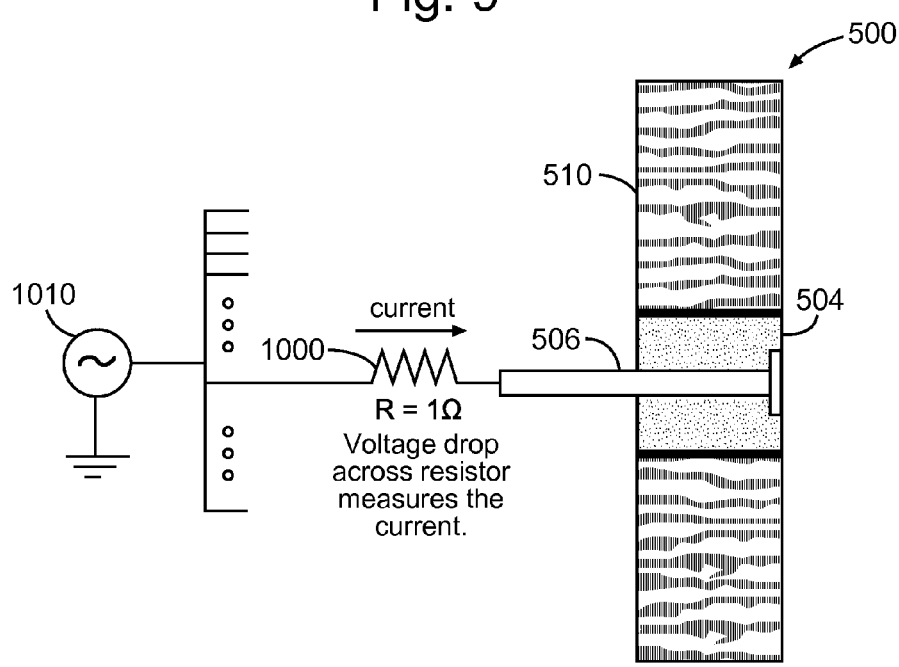
FIG. 10 is a side view of a portion of the apparatus shown in FIG. 5.

FIG. 10 is a side view of a portion of the apparatus 500 shown in FIG. 5. Here, the resistivity results in the tool are evaluated once the focusing conditions are applied. The resistivity is equal to the voltage difference between the center electrode and a reference electrode divided by the current of the image pixels, which can be calibrated using a water tank and a resistor box. The total current emitted by the face of the pad 500 facing the wall of the borehole (i.e., summing over all the electrodes 506 in the pad 500) can be determined as a complementary measurement, to give a higher signal level, and perhaps improve the overall quantitative accuracy of formation structural property measurement processes.

For the pad 500, the current passing through individual electrodes 506 (e.g., as image pixels) is determined by measuring the voltage drop across a known resistance 1000 that is coupled to the electrode 506. The voltage at the electrode 506 is the voltage of the source 1010 minus the voltage drop in the resistance 1000. In this way, the total pad current can be measured, as well as individual electrode currents. Thus, additional modes of operation can be provided.

Figure 11:
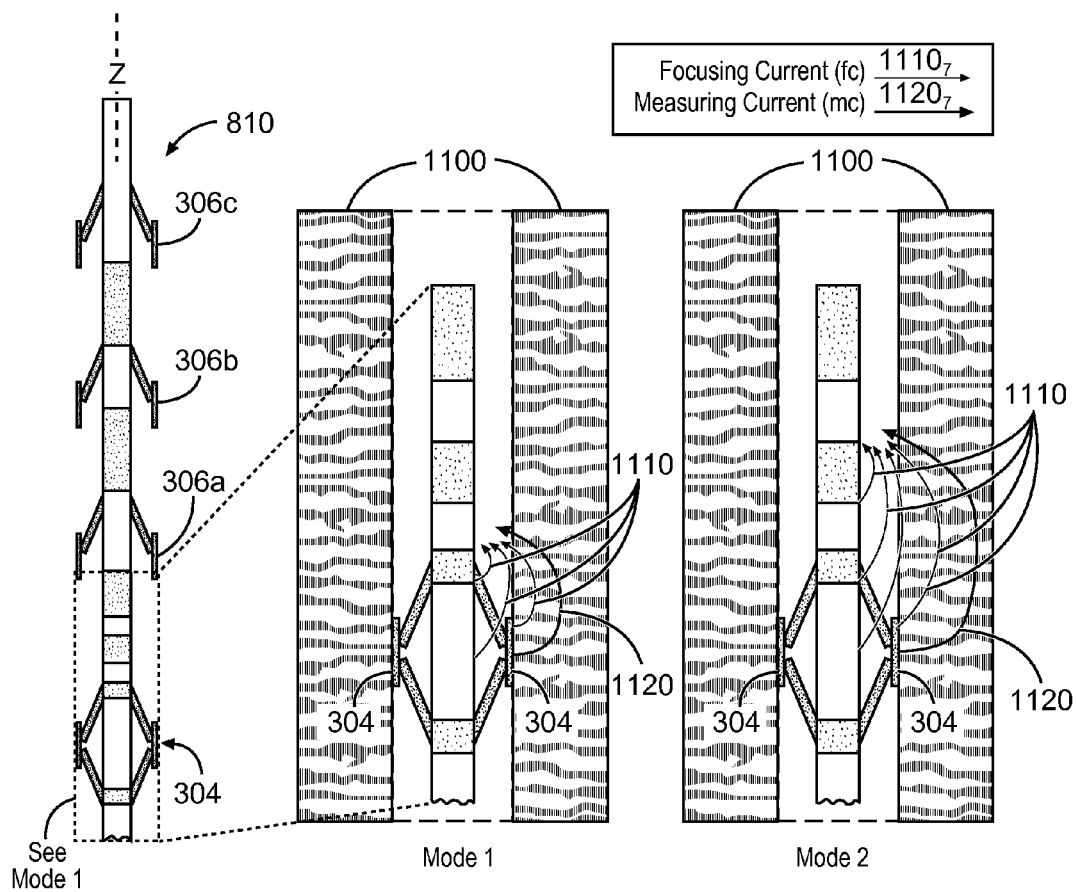
FIG. 11 is a side view of focusing operations in conductive fluids, according to various embodiments of the invention.

For example, FIG. 11 is a side view of focusing operations in conductive fluids, according to various embodiments of the invention. Here it can be seen that even in very conductive fluids, image pixels corresponding to electrodes carried in the center pads 304 can be driven to provide focusing within the formation 1100. Here the description is a qualitative one, and those of ordinary skill in the art, after reviewing this disclosure will realize that voltage profile conditions that should be imposed to achieve the desired depth of focusing can be determined using conventional numerical modeling techniques.

As can be seen in the figure, focusing currents 1110 and measuring currents 1120 can be varied along the axial direction Z to provide different modes of operation. Here, Mode 1 and Mode 2 are labeled arbitrarily. Other modes are possible, as will be perceived by those of ordinary skill in the art after reviewing the content of this document.

Here the electrodes are carried in pads 304 that are pushed against the wall of the borehole in the formation 1100. The potential conditions at the electrodes in the pads 304 are such that currents flowing from the electrodes in the pads 304 will reach deeper and deeper into the formation 1100, depending on the focusing conditions applied to the electrodes.

Figure 12:
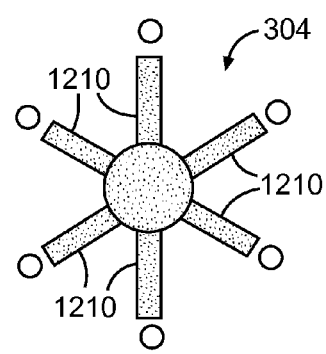
FIG. 12 is a top view of current injection from multiple electrodes at a first elevation, toward one or more electrodes at another elevation, according to various embodiments of the invention.

When operations are carried out in highly conductive mud, some advantages accrue. For example, by pushing the pad 304 against the wall of the borehole, the current flowing through each of the electrodes (corresponding to image pixels in some embodiments) can be focused into the formation and is less affected by the contrast between formation resistivity and mud resistivity, because very little of the conductive medium exists between the pad 304 and the wall of the borehole. Many other modes of operation are possible FIG. 12 is a top view of current injection from multiple electrodes 1210 at a first elevation, toward one or more electrodes at another elevation, according to various embodiments of the invention. Here the pads are again represented symbolically by the electrodes 1210 they carry.

In one mode of operation, the electrodes 1210 are maintained at the same potential, which can be accomplished via switches or multiplexing, to short them all together. The currents they inject into the formation can return to any of the current return pads, away from the elevation at which the pads carrying the electrodes 1210 are located.

For example, referring to FIG. 8, if the electrodes 1210 are carried by pads 304 in the central section of the tool 810, the currents can return to other levels, such as to electrodes carried by pads 306*a*, or 306*b*, or 306*c*. The return currents may have some degree of rotation around the tool 810, depending on the distribution of resistivity in the formation. The measurement of the amount of current returning to each electrode in pads 306 located away from the center of the tool 810 can give some information about the formation, which is not available in standard array laterolog measurements. A tool 810 configured as shown in FIG. 8 can also provide the focused imaging information not available in the standard array laterolog measurements. This way of operating the tool, with the pads at each level shorted together has a certain degree of similarity with the standard array laterolog tool, because at each level where shorting occurs, all of the electrodes in their respective pads have the same potential, and operate to inject current simultaneously. The circles in the drawing represent currents that are injected toward other electrodes located directly above and below the source electrodes 1210.

In some embodiments, the electrodes 1210 may operate in another mode, where each electrode 1210, corresponding to the same pad or different pads at the same elevation, injects current 1210 separately (without being shorted to other electrodes on the same level). This can be accomplished by operating the electrodes 1210 sequentially or by operating them simultaneously, using different frequencies, so that the currents sourced from each electrode 1210 can be uniquely identified. Thus, any number of combinations may be realized. When using different frequencies on each pad, software focusing can be employed to focus the currents deep into the formation, in either orientation, azimuthal or longitudinal, or some combination of these (e.g., a downward or upward spiral around the longitudinal axis of the tool).

Figure 13:
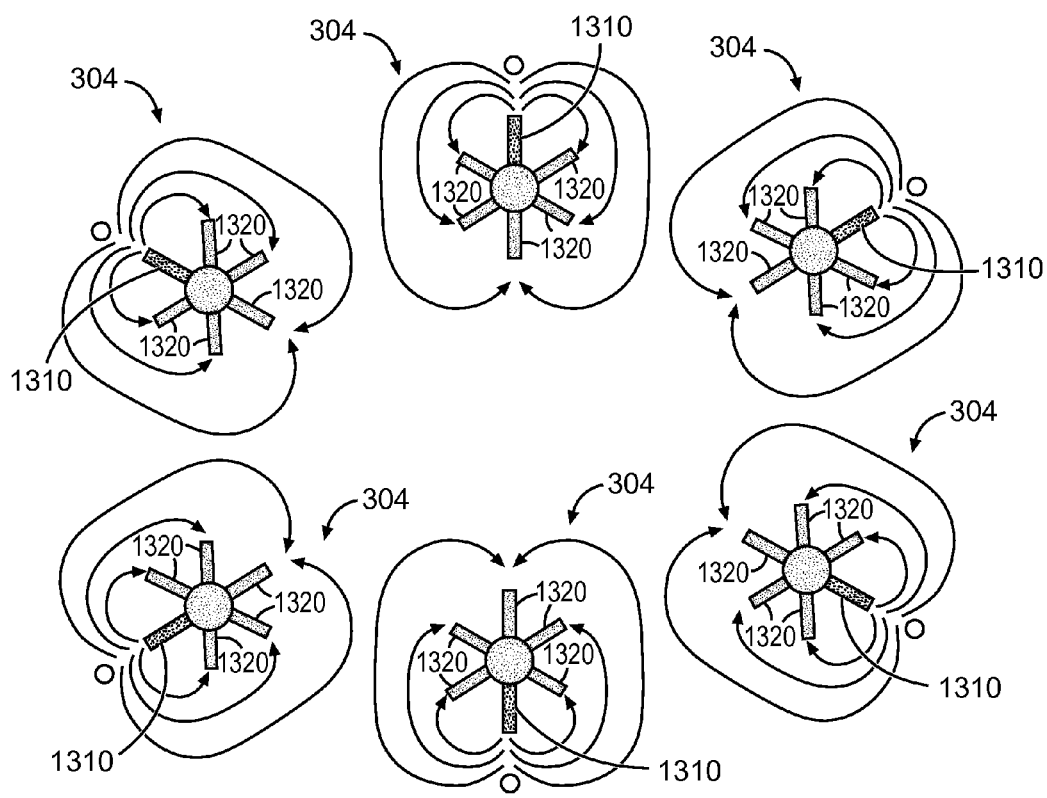
FIG. 13 is a top view of sequenced current injection from electrodes on individual pads, into multiple electrodes at different elevations, or the same elevation, according to various embodiments of the invention.

For example, FIG. 13 is a top view of sequenced current injection from electrodes 1310 on individual pads, into multiple electrodes 1320 at different elevations, or the same elevation, according to various embodiments of the invention. Here, electrodes 1310 on individual pads operate to inject current separately (as was described for the alternate mode of operation in FIG. 12). In this case, the current returns to electrodes 1320 located on pads at levels above and below the elevation of the pad on which the electrode 1310 is located. In other words, referring to FIG. 8, if electrode on pads 304 near the center of the tool 810 are used to inject current in a sequenced fashion, moving in the azimuth direction θ, the current return electrodes may be located on the pads 306*a*, 306*b*, and 306*c*—as well as on other pads that are not shown, on the other half of the tool 810. Current can flow toward electrodes directly above and below the source electrode 1310, as represented by the circles proximate to the electrodes 1310. However, in some embodiments, the current injected into the formation by the electrodes 1310 can be received by other electrodes 1320 at the same elevation. Yet further operational modes are possible.

Figure 14:
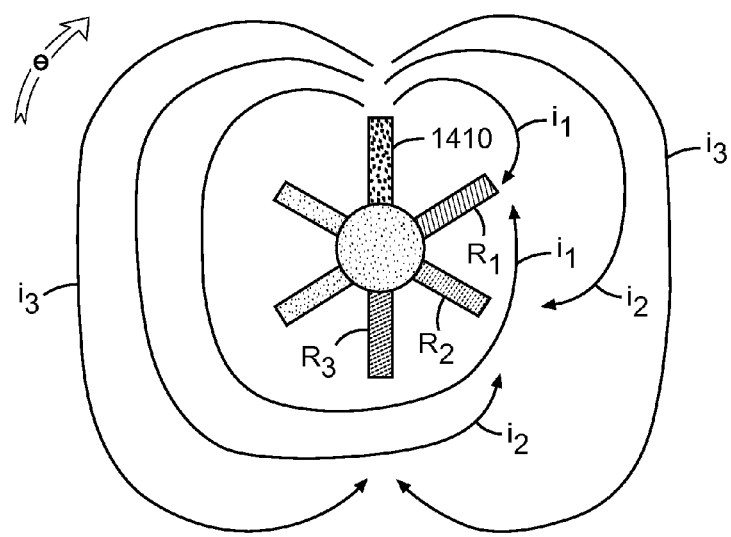
FIG. 14 is a top view of current injection from an electrode on an individual pad, into selected electrodes at different elevations, according to various embodiments of the invention.

For example, FIG. 14 is a top view of current injection from an electrode 1410 on an individual pad, into selected electrodes at different elevations, according to various embodiments of the invention. Thus, it can be seen that many combinations are possible, not all of which are shown in the interest of brevity. Indeed, for N pads per level and M levels, there are N*M different possible operating conditions. In this case, an electrode 1410 is used to inject a current which flows around the wall of the borehole, providing currents i1, i2, i3, to be received by electrodes on other levels R1, R2, R3, respectively. The electrode 1410 may be sequenced in the azimuth direction θ to provide complete coverage of the borehole wall, and thus, the formation surrounding the borehole. These various embodiments provide several advantages over currently available measurement tools.

Figure 15:
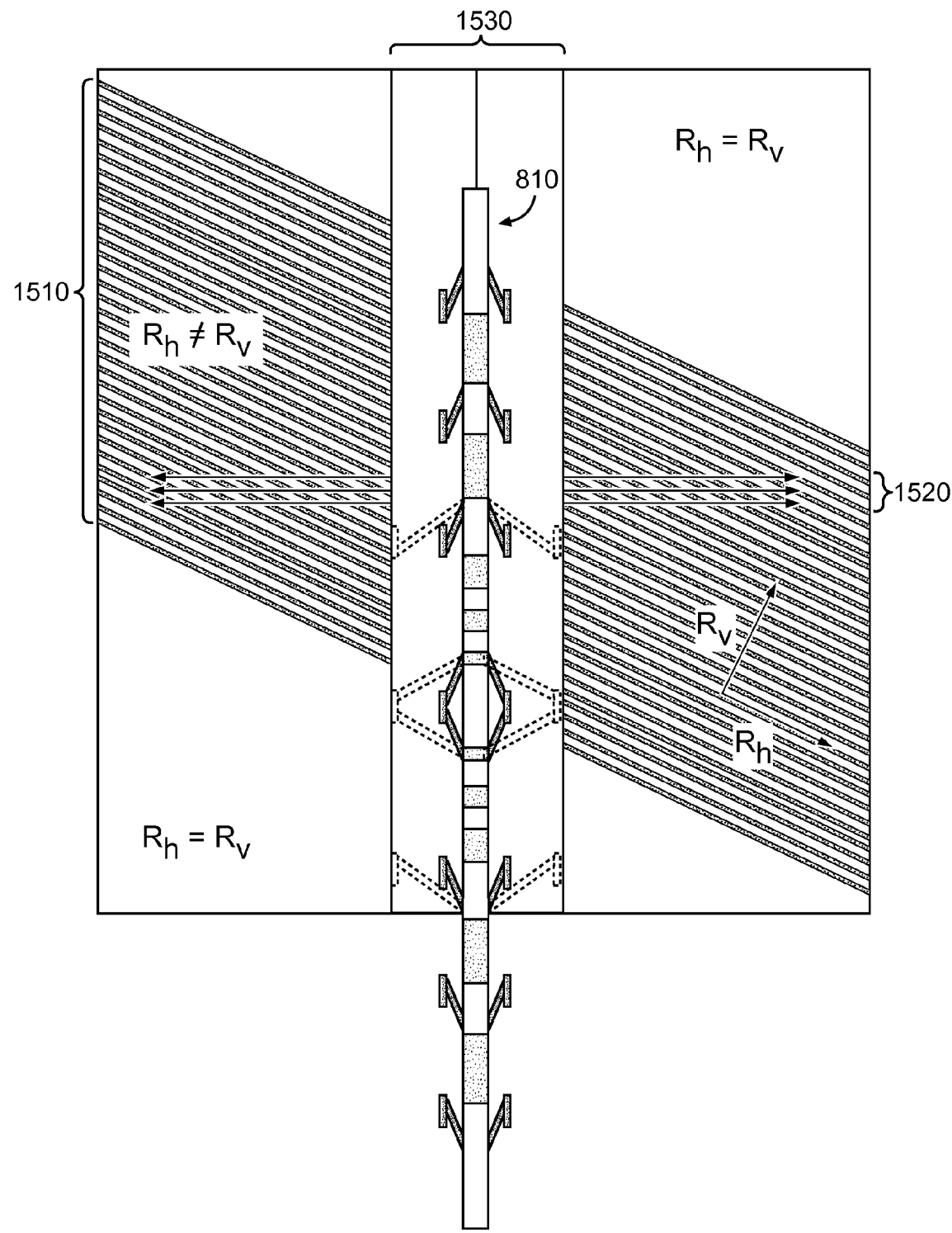
FIG. 15 is a side, cut-away view of current focusing conducted using a tool that carries imaging electrodes on pads in a sand shale formation, according to various embodiments of the invention.

For example, FIG. 15 is a side, cut-away view of current focusing conducted using a tool 810 that carries imaging electrodes on pads in a sand-shale formation 1510, according to various embodiments of the invention. In the presence of relative dip, the focused currents 1520 that provide a substantial contribution to measured resistivity are shown in the figure going across the sand-shale sequence in the formation 1510.

Evaluating resistivity in the presence of transverse isotropic media is useful because this type of formation holds significant reserves around the world, and thus occurs commonly in conjunction with oil and gas exploration. Here the layers in the formation 1510 comprise thin sand and shale sequences, with the shale having a relatively low resistivity and the sand having a relatively high resistivity.

When conventional tools are used in formations that have relatively low dip angles, relative sensitivity is low. A galvanic tool that can detect anisotropy at low dip angles, or even at a zero dip angle in some cases, would solve this important problem and help identify potentially productive reservoirs.

It has been known for some time that conventional electrode tools, such as the array laterolog tool, at low relative dip, do not measure Rv (vertical resistivity, that is perpendicular to the plane of the layers) even though the currents cross a sequence of high-low resistivity layers to reach the return electrode. This has been called the "paradox of anisotropy" in the literature. The literature also notes that the presence of a borehole 1530 gives some sensitivity to anisotropy, although not enough to develop a robust evaluation method. Only in the special case of medium to high relative dip angles can conventional laterolog type tools develop increased sensitivity to Rv.

As a matter of contrast, when the various embodiments are used (e.g., the tool 810 shown in FIG. 15), the source and the sink have azimuth angle discrimination. Angular resolution, without blurring due to conductive mud, can dramatically increase the sensitivity to anisotropy in all directions—not just at the extremes of the strike angle shown in the figure. That is, when various embodiments of the inventions are employed, there is sensitivity even when the fluid in the borehole is conductive, and anisotropy exists at low dip angles, such as in the direction perpendicular to the strike direction. This is in contrast to conventional tools, which tend to average their response across beds, giving only slight sensitivity to this type of formation structure. Still further embodiments may be realized.

Figure 16:
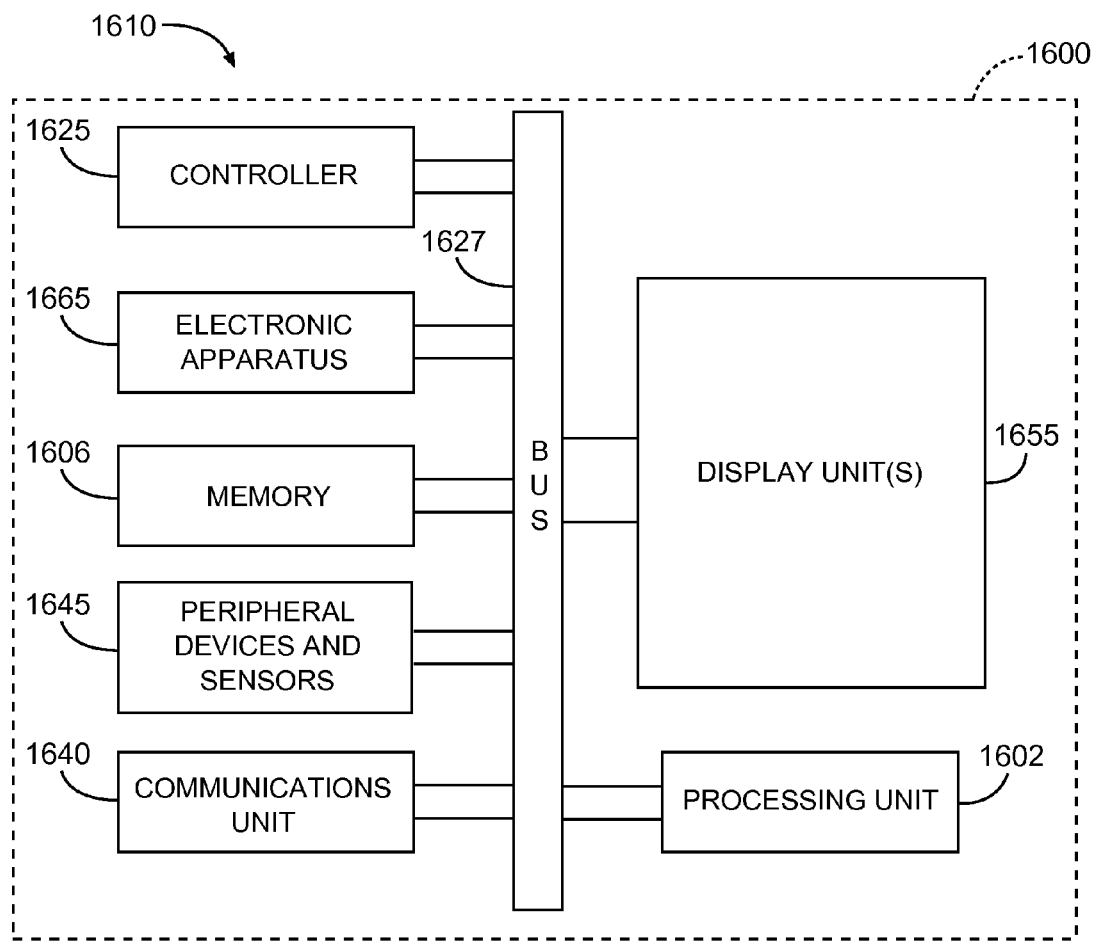
FIG. 16 is a block diagram of a galvanic tool system according to various embodiments of the invention.

For example, FIG. 16 is a block diagram of a galvanic tool system 1600 according to various embodiments of the invention. Referring now to FIGS. 3-16 it can be seen that the system 1600 is closely aligned with the structure and function of the apparatus (in the form of tools 800, 810) shown in FIG. 8. The processing unit 1602 can couple to the tools 800, 810 to obtain resistivity measurements. In some embodiments, a galvanic tool system 1600 comprises one or more of the apparatus 800, 810, perhaps in the form of a housing. The housing might take the form of a wireline tool body, or a downhole tool as described in more detail below with reference to FIGS. 18 and 19. The processing unit 1602 may be part of a surface workstation or attached to a downhole tool housing. In some embodiments, the processing unit 1602 is packaged within the apparatus 800, 810.

The system 1600 can include a controller 1625, other electronic apparatus 1665, and a communications unit 1640. The controller 1625 and the processing unit 1602 can be fabricated to operate one or more components of the apparatus 800, 810 to acquire measurement data, such as resistivity measurements. In some embodiments, the controller 1625 may operate to control the simultaneous injection and/or reception of a set of currents, at the same frequency, or at different frequencies.

Electronic apparatus 1665 (e.g., voltage sources, current sources, electrodes, receivers, antennas, etc.) can be used in conjunction with the controller 1625 to perform tasks associated with taking resistivity measurements downhole. The communications unit 1640 can include downhole communications in a drilling operation. Such downhole communications can include a telemetry system.

The system 1600 can also include a bus 1627 to provide common electrical signal paths between the components of the system 1600. The bus 1627 can include an address bus, a data bus, and a control bus, each independently configured. The bus 1627 can also use common conductive lines for providing one or more of address, data, or control, the use of which can be regulated by the controller 1625.

The bus 1627 can include instrumentality for a communication network. The bus 1627 can be configured such that the components of the system 1600 are distributed. Such distribution can be arranged between downhole components such as the apparatus 800, 810 and components that can be disposed on the surface of a well. Alternatively, several of these components can be co-located, such as on one or more collars of a drill string or on a wireline structure.

In various embodiments, the system 1600 includes peripheral devices that can include displays 1655, additional storage memory, or other control devices that may operate in conjunction with the controller 1625 or the processing unit 1602. The display 1655 can display data, calculated results, resistivity, and diagnostic information for the system 1600 based on the signals generated according to embodiments described above. The display 1655 can also be used to display one or more resistivity plots.

In an embodiment, the controller 1625 can be fabricated to include one or more processors. The display 1655 can be fabricated or programmed to operate with instructions stored in the processing unit 1602 (for example in the memory 1606) to implement a user interface to manage the operation of the system 1600. This type of user interface can be operated in conjunction with the communications unit 1640 and the bus 1627. Various components of the logging system 1600 can be integrated with a housing such that processing identical to or similar to the methods discussed with respect to various embodiments herein can be performed downhole.

In various embodiments, a non-transitory machine-readable storage device can include instructions stored thereon, which, when performed by a machine, cause the machine to become a customized, particular machine that performs operations comprising one or more activities similar to or identical to those described with respect to the methods and techniques described herein. A machine-readable storage device, herein, is a physical device that stores information (e.g., instructions, data), which when stored, alters the physical structure of the device. Examples of machine-readable storage devices include, but are not limited to, memory 1606 in the form of read only memory (ROM), random access memory (RAM), a magnetic disk storage device, an optical storage device, a flash memory, and other electronic, magnetic, or optical memory devices, including combinations thereof.

The physical structure of stored instructions may thus be operated on by one or more processors such as, for example, the processing unit 1602. Operating on these physical structures can cause the machine to perform operations according to methods described herein. The instructions can include instructions to cause the processing unit 1602 to store associated data or other data in the memory 1606. The memory 1606 can store the results of measurements of formation parameters or parameters of the system 500, to include gain parameters, calibration constants, identification data, etc. The memory 1606 can store a log of resistivity measurements obtained by the system 1600. The memory 1606 therefore may include a database, for example a relational database. Still further embodiments may be realized.

Figure 17:
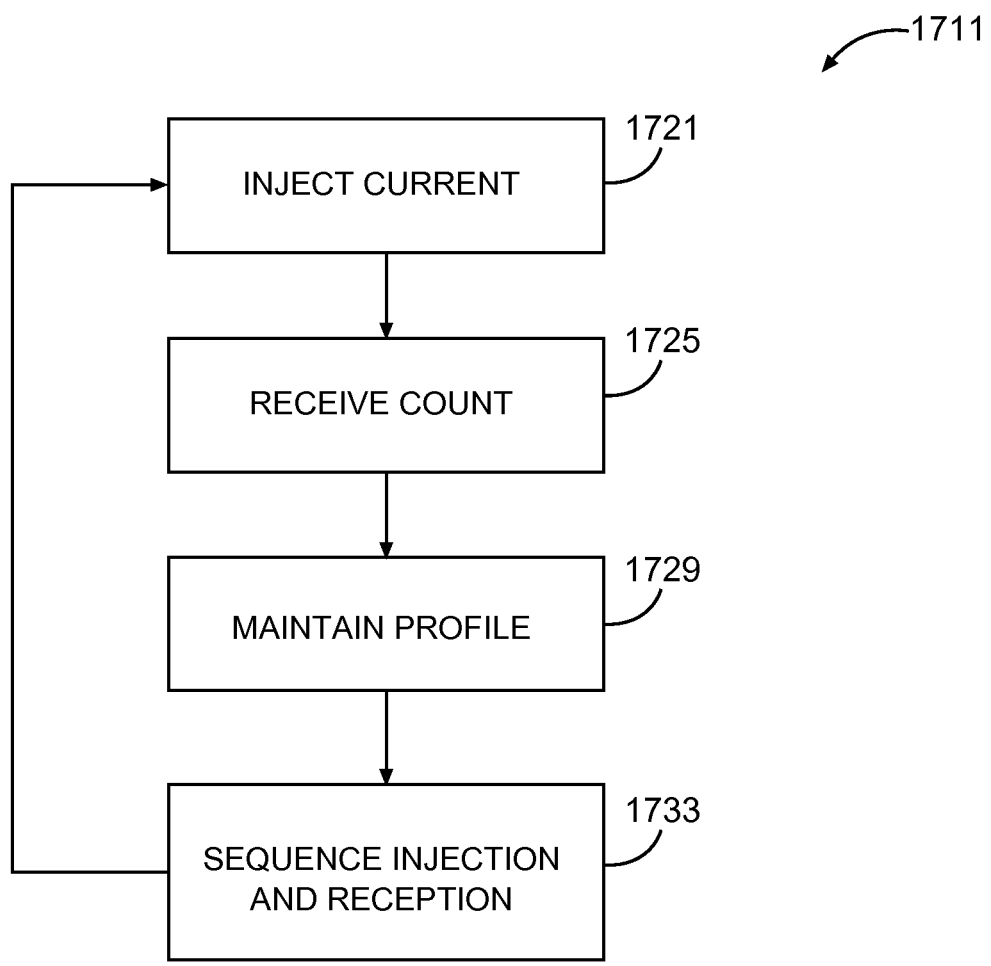
FIG. 17 is a flow diagram illustrating methods of galvanic tool operation, with same-level focusing, according to various embodiments of the invention.

FIG. 17 is a flow diagram illustrating methods 1711 of galvanic tool operation, with same-level focusing, according to various embodiments of the invention. The methods 1711 described herein are with reference to hardware circuitry, measurements, switching, transmission, and reception, etc. shown in FIGS. 3-16. Some operations of the methods 1711 can be performed in whole or in part by the processing unit 1602 or controller 1625 (FIG. 16), although many embodiments are not limited thereto.

It is believed that, other than the embodiments described herein, no mechanism is available to inject and receive current at the same longitudinal level in a borehole, while maintaining a desired voltage profile. The basic apparatus thus includes at least two pads having azimuthally-differentiated electrodes and a current transmission-reception controller.

For the purposes of this document, "azimuthally-differentiated" electrodes are electrodes in a set that are located at different azimuthal locations along a common mounting surface, such as a borehole wall contact pad. When used to inject current, the electrodes may be commonly driven. When used to receive current, the response of each electrode may be measured individually.

In many embodiments, it is assumed that the usual measurements of focused array laterolog devices are also made, with currents and voltages measured (i.e., currents of injection electrodes and voltages of injection electrodes or monitoring electrodes) so that apparent and/or focused resistivity values can be derived. Those of ordinary skill in the art are familiar with such measurements. Others are encouraged to consult the published PCT patent application PCT/US11/58867, which describes how these measurements are made; the content of this published document is incorporated herein by reference in its entirety.

A "selected voltage profile" is maintained by adjusting current provided by one or more electrodes around the borehole. Maintaining a selected profile may thus be as simple as maintaining a fixed voltage between two electrodes, or as complex as measuring a set of voltages at multiple electrodes, and attempting to maintain some desired voltage level at any one or more of the electrodes, including some average value across the set. For example, with two electrodes serving as current sources, each can inject a current so that a voltage profile around the borehole can be imposed on one or more electrodes. This process can involve monitoring voltages at one or more electrodes around the borehole to provide information to the controller to maintain the desired voltage profile at each of the electrodes.

Focusing the transmission of current is useful to achieve penetration into the formation. Thus, in some embodiments, a method 1711 comprises adjusting injected current around the borehole at the same elevation at block 1729, to provide a selected voltage profile at one or more electrodes on the same elevation. Many variations may be realized.

For example, the method 1711 may be carried out as part of a drilling operation, or a wireline logging operation. Thus, in some embodiments a method 1711 may begin at block 1721 with injecting a first current from an electrode at a first azimuthal location into a borehole wall in a geological formation.

The injection of current may include multiple current sources at a first longitudinal location, with azimuthally-differentiated electrodes; and a current sink at a second longitudinal location, with an azimuthally-differentiated electrode. Thus, that activity of injecting current at block 1721 may comprise substantially simultaneously transmitting the currents from more than one azimuthally-differentiated electrode at one of the more than one longitudinal locations.

The method 1711 may continue on to block 1725 to include receiving the first current at a second electrode at a second azimuthal location in the borehole wall, wherein the first and second azimuthal locations are disposed approximately along a first longitudinal location of the borehole wall. The activity at block 1725 may also comprise receiving the currents at a third electrode (included in one of a set of azimuthally-differentiated electrodes) at a second longitudinal location in the borehole wall, wherein the second longitudinal location is different from the more than one longitudinal location, to provide focusing of the currents within the geological formation.

Currents may be injected at one longitudinal location, and received at another. The electrode types may be the same, or different. Thus, the activity at block 1725 may comprise receiving the first current at a third electrode at a second longitudinal location of the borehole wall, wherein the first current is adjusted to maintain a selected voltage profile between the electrodes at the first and second longitudinal locations (see activity description for block 1729).

Additional injection activity may occur at block 1721, such as injecting a second current from an electrode at a third azimuthal location into the borehole wall, wherein the first and third azimuthal locations are disposed approximately along the first longitudinal location of the borehole wall. In some embodiments, the activity at block 1721 includes injecting currents from at least one azimuthally-differentiated electrode and another electrode at more than one longitudinal location, maintained at substantially a same potential in a borehole wall in a geological formation (see activity description for block 1729).

The method 1711 may continue on to block 1729 to include adjusting the first current to maintain a selected voltage profile between the electrodes at the first and second azimuthal locations, even when the electrodes at the first and second azimuthal locations are members of two different sets of azimuthally-differentiated electrodes.

A voltage profile may be maintained by injecting more than one current into a formation, at the same longitudinal location, and controlling the measured voltage around the borehole, within a span that begins at the electrode that injects the first current, continues toward an electrode that injects a second current, and ends with an electrode that receives the first and second currents. Thus, the method 1711 may comprise, at block 1725, the activity of receiving the second current at the second electrode, wherein the second current is adjusted to maintain the selected voltage profile between the electrodes at the first and third azimuthal locations, and wherein the electrodes at the first and third azimuthal locations are members of two different sets of azimuthally-differentiated electrodes, at block 1729. In general, the larger the borehole coverage (i.e., the portion of the borehole perimeter covered by pads compared with the total perimeter around the borehole), the larger the degree of control of the voltage profile along the angular direction.

Electrode injection and reception activity can be effected by sequencing the current source and sink in the azimuthal direction. Thus, the method 1722 may continue on to block 1733 with sequencing, along a direction including the first and second azimuthal locations, injection of an additional current by additional sets of azimuthally-differentiated electrodes disposed on separate pads located at the first longitudinal location, to be received by at least one azimuthally-differentiated electrode on another pad located at the first longitudinal location. Each pad (and even different electrodes on the same pad, or on different pads) can inject current with a different frequency, operating simultaneously. The currents can be used focused using software focusing. Alternatively, hardware focused modes can be used sequentially.

Electrode transmission and reception can be effected by sequencing one electrode as a source, with one or more remaining electrodes as simultaneous sinks. Thus, the activity at block 1733 may comprise sequencing, along a direction including the first and second azimuthal locations, injection of an additional current by additional sets of azimuthally-differentiated electrodes disposed on separate pads located at the first longitudinal location, to be substantially simultaneously received by more than one set of azimuthally-differentiated electrodes on remaining pads located at the first longitudinal location.

Electrode transmission and reception can be effected by sequencing one electrode as a sink, with one or more remaining electrodes as simultaneous sources. Thus, the activity at block 1733 may comprise sequencing, along a direction including the first and second azimuthal locations, substantially simultaneous injection of additional currents by additional sets of azimuthally-differentiated electrodes disposed on separate pads located at the first longitudinal location, to be received by one set of azimuthally-differentiated electrodes on a remaining pad located at the first longitudinal location.

Electrode transmission and reception can be effected by using a sequenced current source on first longitudinal location, and a sequenced current sink on a second longitudinal location. Thus, the activity at block 1733 may comprise current injection by sequencing, along a direction including the first and second azimuthal locations, injection of the first current by azimuthally-differentiated electrodes disposed on separate pads located at the first longitudinal location. Additional activity may include sequencing reception of the first current by at least one azimuthally-differentiated electrode on another pad located at a second longitudinal location.

The injection of current can be sequenced in the azimuthal direction, or in the longitudinal direction, or both. For example, a current source can be activated at a first longitudinal location, with first azimuthally-differentiated electrode, and current sinks can be activated at second and third longitudinal locations, with second and third azimuthally-differentiated electrodes. Thus, the activity at block 1733 may comprise sequencing the injecting, about an azimuthal direction, at one of the more than one longitudinal locations.

In some embodiments, injecting a set of currents comprises simultaneously injecting some of the currents at different frequencies. In some embodiments, receiving a set of currents comprises simultaneously receiving some of the currents at different frequencies It should be noted that the methods described herein do not have to be executed in the order described, or in any particular order, unless explicitly specified as such. Moreover, various activities described with respect to the methods identified herein can be executed in iterative, serial, or parallel fashion. Information, including parameters, commands, operands, and other data, can be sent and received in the form of one or more carrier waves.

Upon reading and comprehending the content of this disclosure, one of ordinary skill in the art will understand the manner in which a software program can be launched from a computer-readable medium in a computer-based system to execute the functions defined in the software program. One of ordinary skill in the art will further understand the various programming languages that may be employed to create one or more software programs designed to implement and perform the methods disclosed herein. For example, the programs may be structured in an object-orientated format using an object-oriented language such as Java or C#. In another example, the programs can be structured in a procedure-orientated format using a procedural language, such as assembly or C. The software components may communicate using any of a number of mechanisms well known to those of ordinary skill in the art, such as application program interfaces or interprocess communication techniques, including remote procedure calls. The teachings of various embodiments are not limited to any particular programming language or environment. Thus, other embodiments may be realized.

Figure 18:
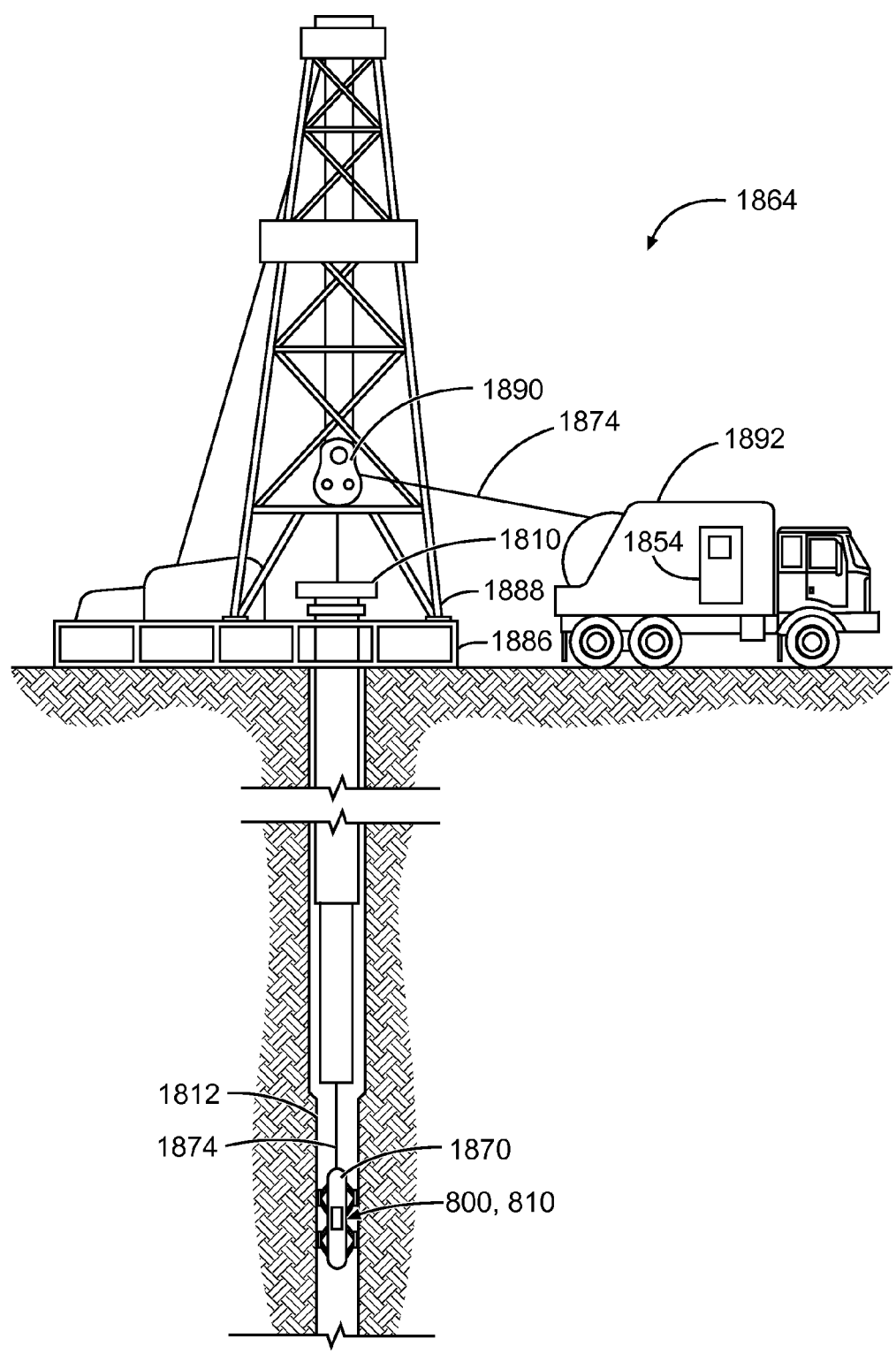
FIG. 18 depicts an example wireline system, according to various embodiments of the invention.
Figure 19:
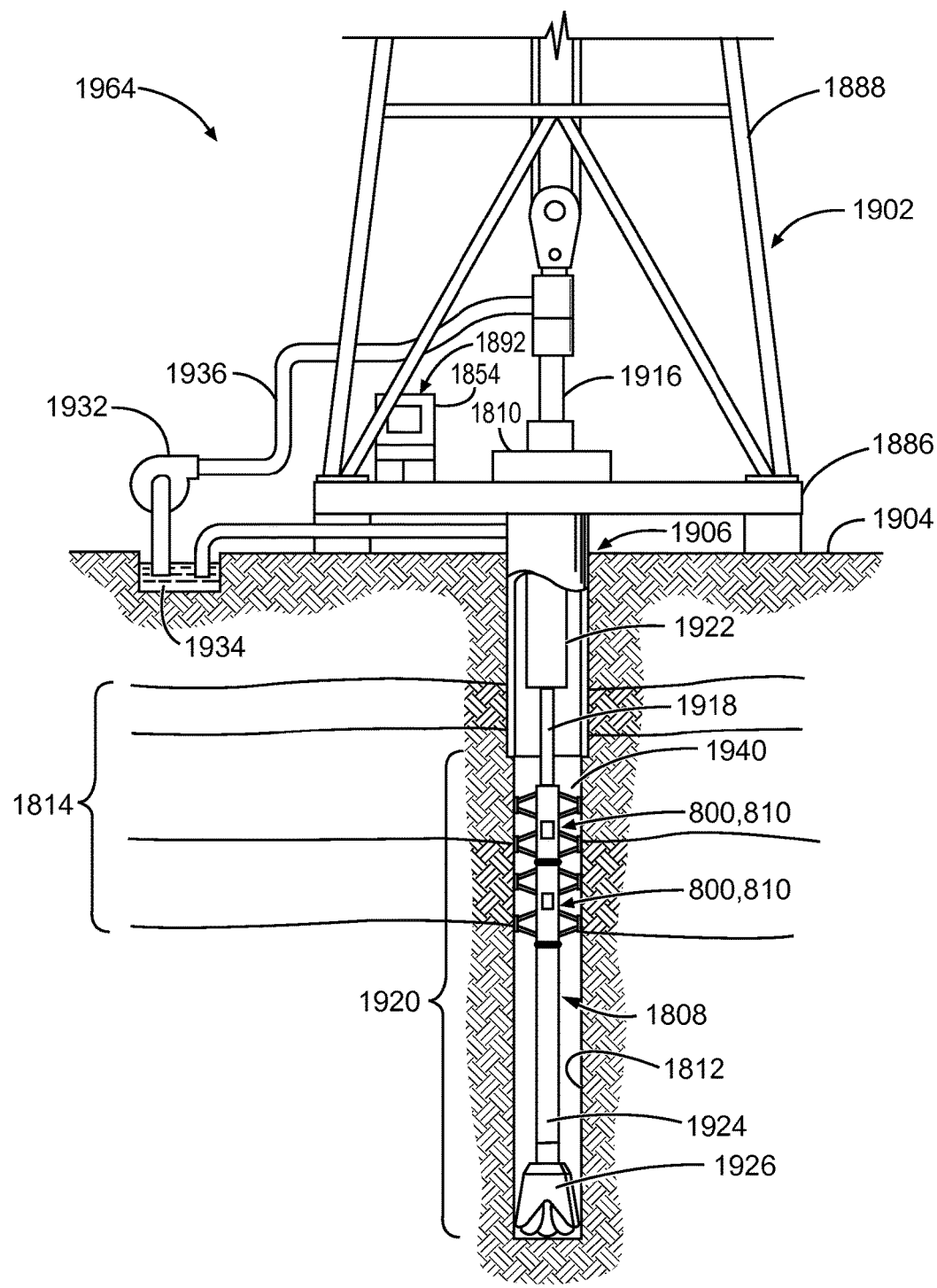
FIG. 19 depicts an example drilling rig system, according to various embodiments of the invention.

For example, FIG. 18 depicts an example wireline system 1864, according to various embodiments of the invention. FIG. 19 depicts an example drilling rig system 1964, according to various embodiments of the invention. Either of the systems in FIG. 18 and FIG. 19 are operable to control an apparatus 800, 810 and/or system 1600 to conduct measurements in a wellbore. Thus, the systems 1864, 1964 may comprise portions of a wireline logging tool body 1870 as part of a wireline logging operation, or of a downhole tool 1024 (e.g., a drilling operations tool) as part of a downhole drilling operation.

Returning now to FIG. 18, a well during wireline logging operations can be seen. In this case, a drilling platform 1886 is equipped with a derrick 1888 that supports a hoist 1890.

Drilling oil and gas wells is commonly carried out using a string of drill pipes connected together so as to form a drilling string that is lowered through a rotary table 1810 into a wellbore or borehole 1812. Here it is assumed that the drilling string has been temporarily removed from the borehole 1812 to allow a wireline logging tool body 1870, such as a probe or sonde, to be lowered by wireline or logging cable 1874 into the borehole 1812. Typically, the wireline logging tool body 1870 is lowered to the bottom of the region of interest and subsequently pulled upward at a substantially constant speed.

During the upward trip, at a series of depths the instruments (e.g., the apparatus 800, 810 or system 1600 shown in FIGS. 8 and 17) included in the tool body 1870 may be used to perform measurements on the subsurface geological formations adjacent the borehole 1812 (and the tool body 1870, which can serve as a housing for various electrodes and antennas). The measurement data can be communicated to a surface logging facility 1892 for storage, processing, and analysis. The logging facility 1892 may be provided with electronic equipment for various types of signal processing, which may be implemented by any one or more of the components of the resistivity measurement apparatus 800, 810 and system 1600. Similar formation evaluation data may be gathered and analyzed during drilling operations (e.g., during LWD operations, and by extension, sampling while drilling).

In some embodiments, the tool body 1870 comprises a resistivity measurement apparatus 800, 810 and/or system 1600 for obtaining and analyzing resistivity measurements in a subterranean formation through a borehole 1812. The tool is suspended in the wellbore by a wireline cable 1874 that connects the tool to a surface control unit (e.g., comprising a workstation 1854, which can also include a display). The tool may be deployed in the borehole 1812 on coiled tubing, jointed drill pipe, hard wired drill pipe, or any other suitable deployment technique.

Turning now to FIG. 19, it can be seen how a system 1964 may also form a portion of a drilling rig 1902 located at the surface 1904 of a well 1906. The drilling rig 1902 may provide support for a drill string 1908. The drill string 1908 may operate to penetrate the rotary table 1810 for drilling the borehole 1812 through the subsurface formations 1814. The drill string 1908 may include a Kelly 1916, drill pipe 1918, and a bottom hole assembly 1920, perhaps located at the lower portion of the drill pipe 1918.

The bottom hole assembly 1920 may include drill collars 1922, a downhole tool 1924, and a drill bit 1926. The drill bit 1926 may operate to create the borehole 1812 by penetrating the surface 1904 and the subsurface formations

1914. The downhole tool 1924 may comprise any of a number of different types of tools including MWD tools, LWD tools, and others.

During drilling operations, the drill string 1908 (perhaps including the Kelly 1916, the drill pipe 1918, and the bottom hole assembly 1920) may be rotated by the rotary table 1810. Although not shown, in addition to, or alternatively, the bottom hole assembly 1920 may also be rotated by a motor (e.g., a mud motor) that is located downhole. The drill collars 1922 may be used to add weight to the drill bit 1926. The drill collars 1922 may also operate to stiffen the bottom hole assembly 1920, allowing the bottom hole assembly 1920 to transfer the added weight to the drill bit 1926, and in turn, to assist the drill bit 1926 in penetrating the surface 1904 and subsurface formations 1914.

During drilling operations, a mud pump 1932 may pump drilling fluid (sometimes known by those of ordinary skill in the art as "drilling mud") from a mud pit 1934 through a hose 1936 into the drill pipe 1918 and down to the drill bit 1926. The drilling fluid can flow out from the drill bit 1926 and be returned to the surface 1904 through an annular area 1940 between the drill pipe 1918 and the sides of the borehole 1812. The drilling fluid may then be returned to the mud pit 1934, where such fluid is filtered. In some embodiments, the drilling fluid can be used to cool the drill bit 1926, as well as to provide lubrication for the drill bit 1926 during drilling operations. Additionally, the drilling fluid may be used to remove subsurface formation cuttings created by operating the drill bit 1926.

Thus, it may be seen that in some embodiments, the systems 1864, 1964 may include a drill collar 1922, a downhole tool 1924, and/or a wireline logging tool body 1870 to house one or more measurement apparatus 800, 810, similar to or identical to the apparatus 800, 810 described above and illustrated in FIG. 8. Components of the system 1600 in FIG. 17 may also be attached to or housed by the tool 1924 or the tool body 1870, to be constructed and operated as described previously.

Thus, for the purposes of this document, the term "housing" may include any one or more of a drill collar 1922, a downhole tool 1924, or a wireline logging tool body 1870, all having an outer wall that is shared among a number of components. Thus, a housing can be used to enclose or attach to magnetometers, sensors, electrodes, fluid sampling devices, pressure measurement devices, antennae, transmitters, receivers, acquisition and processing logic, and data acquisition systems. The tool 1924 may comprise a downhole tool, such as an LWD tool or MWD tool. In the case of LWD or MWD tools the pads can be fixed in relation to the formation while the center mandrel rotates with the drilling operation. The pads can also be extended only when the rotation stops, to make measurements as desired. The wireline tool body 1870 may comprise a wireline logging tool, including a probe or sonde, for example, coupled to a logging cable 1874. Many embodiments may thus be realized.

In some embodiments, the apparatus 800, 810 may be constructed in the form of a downhole tool. Thus, referring to FIGS. 1-8 and 16 it can be seen that an apparatus 800, 810 may comprise one or more pads having azimuthally-differentiated electrodes and a current transmission-reception controller (e.g., the processing unit 1602).

In some embodiments, an apparatus 800, 810 comprises a first set and a second set of azimuthally-differentiated current injection electrodes (e.g., 506 in FIG. 5, or 620 in FIG. 6), the first and second sets disposed on an outward-facing surface of first and second pads (e.g., pads 500 in FIG. 5, or pads 600 in FIG. 6), respectively, the first and second pads configured to attach to a housing (e.g., the body of the apparatus 800, 810) and to engage in physical contact with a surrounding borehole wall.

The apparatus 800, 810 may further comprise a controller (e.g., in the form of a processing unit 1602) to control injection of a current from the first set into the borehole wall at a first azimuthal location, and to control reception of the current in the borehole wall by the second set at a second azimuthal location, wherein the azimuthal locations are disposed approximately along a first longitudinal location of the housing, and wherein the current is adjustable by the controller to maintain a selected voltage profile between the sets.

Individual electrodes may be insulated from a surrounding conductor, such as a guard. For example, as shown in FIG. 5, azimuthally-differentiated current injection electrodes are disposed on the pad 500 comprising a plurality of electrodes 506 dispersed in an azimuthal direction and arranged in horizontal rows, wherein each one of the electrodes 506 is surrounded by insulation 504 to separate the electrodes 506 from a focusing conductor 510.

The individual electrodes may form part of a common conductive base. For example, as shown in FIG. 6, azimuthally-differentiated current injection electrodes disposed on the pad 600 comprise a single conductor having segments dispersed in an azimuthal direction and arranged in at least one horizontal row, and each one of the segments is surrounded by a coil 630.

Toroidal cores can be used as sensing elements for each electrode, to measure the magnitude of received signals in the formation. Thus, the coil 630 may comprise a toroidal core about which a conductor is wound. The single conductor with grooves that makes up the pad in this case can have any one or more surfaces covered with an insulating material to prevent current from flowing directly into the borehole. For example, the edges of the face in contact with the borehole surface can be covered with an insulating material (shown in FIG. 5).

The pads upon which the electrode sets are mounted may be disposed symmetrically, or asymmetrically. Thus, in some embodiments, the pads are disposed at an azimuthal angle of less than 180 degrees from each other (see FIGS. 9, 12, etc.).

Some embodiments make use of four, six, or more pads (including four, six, or more sets of electrodes, respectively). Thus, in some embodiments, the pads form part of a group of at least four pads spaced substantially equally apart in an azimuthal direction (again, see FIGS. 9, 12, etc.).

The apparatus may include one or more circumferential current injection electrodes. Thus, in some embodiments, the apparatus 800, 810 comprises at least one circumferential current injection electrode attached to the housing at a second longitudinal location on the housing (the same as or different from the first longitudinal location, where the pads are installed. In FIG. 7, the second longitudinal location is different from the first longitudinal location. Still further embodiments may be realized.

For example, a system 1600, 1864, 1964 may comprises a housing (e.g., a tool body, such as the tool body forming part of the apparatus 800, 810 in FIG. 8), two pads with individual sets of electrodes (e.g., pads 500, 600 in FIGS. 5, 6, respectively), and a controller, such as the processing unit 1602, to manage the injection of current into the formation, and to monitor the reception of the current coming out of the formation and voltages at monitoring electrodes.

In some embodiments, a system 1600, 1864, 1964 comprises a downhole tool housing (e.g., forming part of the apparatus 800, 810) having a longitudinal (Z) axis. The system 1600, 1864, 1964 further comprises a first set and a second set of azimuthally-differentiated current injection electrodes 506, 620, the first and second sets disposed on an outward-facing surface of first and second pads 500, 600, respectively, the first and second pads 500, 600 configured to attach to the housing and to engage in physical contact with a surrounding borehole wall. The system 1600, 1864, 1964 also comprises a controller (e.g., a processing unit 1602) to control transmission of a current from the first set into the borehole wall at a first azimuthal location, and to control reception of the current in the borehole wall by the second set at a second azimuthal location, wherein the azimuthal locations are disposed approximately along a first longitudinal location of the housing, and wherein the current is adjustable by the controller to maintain a selected voltage profile between the sets.

The system may include multiple circumferential electrodes, mounted on either side of the azimuthally-differentiated electrodes in the longitudinal direction. Thus, the system 1600, 1864, 1964 may comprise a set of circumferential current injection electrodes having members disposed substantially symmetrically in a longitudinal direction on either side of the first and second pads (e.g., as shown in FIG. 15).

The system can be used in both wireline and drilling applications. Thus, the downhole tool housing (see apparatus 800, 810 in FIG. 8) may comprise one of a wireline tool housing or a drill string tool housing.

Any of the above components, for example the resistivity measurement apparatus 800, 810 (and each of its elements), the systems 1600, 1864, 1964 (and each of their elements) may all be characterized as "modules" herein. Such modules may include hardware circuitry, and/or a processor and/or memory circuits, software program modules and objects, and/or firmware, and combinations thereof, as desired by the architect of the apparatus 800, 810 and systems 1600, 1864, 1964 and as appropriate for particular implementations of various embodiments. For example, in some embodiments, such modules may be included in an apparatus and/or system operation simulation package, such as a software electrical signal simulation package, an electrode current propagation package, resistivity measurement package, a power usage and distribution simulation package, a power/heat dissipation simulation package, a measured radiation simulation package, and/or a combination of software and hardware used to simulate the operation of various potential embodiments. Many more embodiments may be realized, but have not been explicitly listed here in the interest of brevity.

It should also be understood that the apparatus and systems of various embodiments can be used in applications other than for logging operations, and thus, various embodiments are not to be so limited. The illustrations of the apparatus and systems are intended to provide a general understanding of the structure of various embodiments, and they are not intended to serve as a complete description of all the elements and features of apparatus and systems that might make use of the structures described herein.

In summary, using the apparatus, systems, and methods disclosed herein may provide improved resistivity measurement resolution, especially with regard to focusing into the formation, and in the azimuthal direction. Formation properties can now be measured more accurately, and with higher resolution, even when fresh mud fills the borehole or when OBM is present; direct contact between the injecting and receiving current electrodes and the borehole wall may further improve results. Measurement of Rh and Rv for small dip angle conditions, including those present in sand-shale layers, is also improved. These advantages can significantly enhance the value of the services provided by an operation/exploration company, helping to reduce operational costs and increase customer satisfaction.

The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

Such embodiments of the inventive subject matter may be referred to herein, individually and/or collectively, by the term "invention" merely for convenience and without intending to voluntarily limit the scope of this application to any single invention or inventive concept if more than one is in fact disclosed. Thus, although specific embodiments have been illustrated and described herein, it should be appreciated that any arrangement calculated to achieve the same purpose may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

In the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment.

What is claimed is:

1. An apparatus, comprising:
   a first set of azimuthally-offset electrodes disposed on an outward-facing surface of a first pad that is attached to a housing, wherein the first set of azimuthally-offset electrodes comprise a single conductor with grooves encircling conductor surfaces dispersed in an azimuthal direction and arranged in at least one horizontal row, and wherein each of the surfaces is surrounded by a coil;
   a second set of azimuthally-offset electrodes disposed on the outward-facing surface of a second pad that is attached to the housing; and
   a controller to,
      control injection of a current from the first set of electrodes at a first azimuthal location; and
      monitor reception of the current by the second set of electrodes at a second azimuthal location.

2. The apparatus of claim 1, wherein the controller is configured to adjust the current to maintain a selected voltage profile between the first and second sets of electrodes.

3. The apparatus of claim 1, wherein the first set of azimuthally-offset electrodes comprise a plurality of electrodes azimuthally dispersed and arranged in lateral rows orthogonal to the longitudinal direction of the housing, and wherein each one of the electrodes is surrounded by insulation.

4. The apparatus of claim 1, wherein the coil comprises a toroidal core about which a conductor is wound.

5. The apparatus of claim 1, wherein the first and second pads are disposed at an azimuthal angle of less than 180 degrees from each other.

6. The apparatus of claim 1, wherein the first and second pads form part of a group of at least four pads spaced substantially equally apart in an azimuthal direction.

7. The apparatus of claim 1, wherein the first set of azimuthally-offset electrodes includes individual electrodes that are simultaneously operated by the controller to control the injection and the reception, at different frequencies.

8. A method comprising:
injecting a first current from an electrode at a first azimuthal location into a borehole wall in a geological formation;
receiving the first current at a second electrode at a second azimuthal location in the borehole wall, wherein the first and second azimuthal locations are disposed approximately along a first longitudinal location of the borehole wall, wherein the first current is adjusted to maintain a selected voltage profile between the electrodes at the first and second azimuthal locations, and wherein the electrodes at the first and second azimuthal locations are members of two different sets of azimuthally-differentiated electrodes;
injecting a second current from an electrode at a third azimuthal location into the borehole wall, wherein the first and third azimuthal locations are disposed approximately along the first longitudinal location of the borehole wall; and
receiving the second current at the second electrode, wherein the second current is adjusted to maintain the selected voltage profile between the electrodes at the first and third azimuthal locations, and wherein the electrodes at the first and third azimuthal locations are members of two different sets of azimuthally-differentiated electrodes; and
sequencing, along a direction including the first and second azimuthal locations, injection of an additional current by additional sets of azimuthally-differentiated electrodes disposed on separate pads located at the first longitudinal location, to be received by at least one azimuthally-differentiated electrode on another pad located at the first longitudinal location.

9. The method of claim 8, further comprising:
receiving the first current at a third electrode at a second longitudinal location of the borehole wall, wherein the first current is adjusted to maintain a selected voltage profile between the electrodes at the first and second longitudinal locations.

10. The method of claim 8, further comprising:
sequencing, along a direction including the first and second azimuthal locations,
injection of an additional current by additional sets of azimuthally-differentiated electrodes disposed on separate pads located at the first longitudinal location, to be substantially simultaneously received by more than one set of azimuthally-differentiated electrodes on remaining pads located at the first longitudinal location.

11. The method of claim 8, further comprising:
sequencing, along a direction including the first and second azimuthal locations, substantially simultaneous injection of additional currents by additional sets of azimuthally-differentiated electrodes disposed on separate pads located at the first longitudinal location, to be received by one set of azimuthally-differentiated electrodes on a remaining pad located at the first longitudinal location.

12. The method of claim 8, wherein the current injection includes sequencing, along a direction including the first and second azimuthal locations, injection of the first current by azimuthally-differentiated electrodes disposed on separate pads located at the first longitudinal location, further comprising:
sequencing reception of the first current by at least one azimuthally-differentiated electrode on another pad located at a second longitudinal location.

13. The method of claim 8, further comprising:
simultaneously with the injecting of the first current, injecting a second current from an electrode at a third azimuthal location into the borehole wall, wherein the first and third azimuthal locations are disposed approximately along the first longitudinal location of the borehole wall, and wherein a frequency of the second current is different from a frequency of the first current.

* * * * *